United States Patent
Shimizu et al.

[11] Patent Number: 5,937,704
[45] Date of Patent: Aug. 17, 1999

[54] CABLE-TYPE STEERING DEVICE

[75] Inventors: Yasuo Shimizu; Hiroshi Tabata, both of Wako, Japan

[73] Assignee: Honda Giken Kogyo Kabushiki Kaisha, Tokyo, Japan

[21] Appl. No.: 08/917,227

[22] Filed: Aug. 25, 1997

[30] Foreign Application Priority Data

Aug. 26, 1996 [JP] Japan ..................................... 8-223469

[51] Int. Cl.$^6$ ..................................................... F16C 1/10
[52] U.S. Cl. ......................................... 74/500.5; 74/501.6
[58] Field of Search ........................... 74/500.5, 501.5 R, 74/501.6, 502, 502.3, 502.4, 502.6, 480 B, 479.01, 496

[56] References Cited

U.S. PATENT DOCUMENTS

| | | | |
|---|---|---|---|
| 3,039,420 | 6/1962 | Bevis et al. | 74/501.6 X |
| 4,041,797 | 8/1977 | Mito | 74/500.5 |
| 5,433,126 | 7/1995 | Corbett | 74/501.6 |
| 5,555,769 | 9/1996 | Lichtenberg | 74/501.5 R X |

FOREIGN PATENT DOCUMENTS

| | | | |
|---|---|---|---|
| 80841 | 3/1990 | Japan | 74/501.6 |
| 8-2431 | 1/1996 | Japan . | |

*Primary Examiner*—John A. Jeffery
*Assistant Examiner*—Mary Ann Battista
*Attorney, Agent, or Firm*—Armstrong, Westerman, Hattori, McLeland, & Naughton

[57] ABSTRACT

A cable-type steering device in which a steering wheel and a gear box are connected to each other by wires includes a relatively simple structure to effectively buffer road surface reaction torques which may be inputted from the vehicle wheels. An outer tube of a Bowden wire is slidably supported at its end in a wire penetration bore defined in a housing. The end of the outer tube is biased outwardly from the housing by a coil spring. An inner cable slidably accommodated in the outer tube is connected at its end to a pulley rotatably accommodated in the housing. If a large road surface reaction load is applied from wheels via gear box to the pulley, the outer tube is moved in unison with the inner cable, while compressing the coil spring, thereby preventing the road surface reaction load from being transmitted to a steering wheel.

2 Claims, 5 Drawing Sheets

CABLE-TYPE STEERING DEVICE

BACKGROUND OF THE INVENTION

1. Technical Field of the Invention

The present invention relates to a cable-type steering device in which a steering wheel and a gear box are connected to each other by flexible cables such as Bowden wires.

2. Description of Related Art

In a conventional steering device for a vehicle, a steering shaft having a steering wheel at an upper end thereof is connected at its lower end to a gear box, so that the steering torque inputted to the steering wheel is transmitted through the steering shaft to a rack and pinion mechanism which is mounted within the gear box.

However, if the steering wheel and the gear box are connected to each other using the steering shaft, the position of the steering wheel relative to the position of the gear box is relatively fixed and there is little freedom in selecting a preferred position for each element. For this reason, there is encountered a problem in that the degree of freedom of design is substantially limited, and further, the gear box cannot be commonly used in a right-hand steered vehicle and a left-hand steered vehicle. Moreover, another problem is that vibrations inputted to a tire from a road surface and the vibration of an engine are inputted to the steering wheel through the steering shaft and hence, the level of audible sound or silence within a vehicle compartment and the riding comfort are impeded by such vibrations.

Therefore, there is a proposed cable-type steering device which employs a flexible transmitting means such as Bowden wire and the like in place of the conventional steering shaft (see Japanese Patent Application Laid-open No.8-2431).

If the construction of the proposed cable-type steering device is used, the position of the steering wheel relative to the position of the gear box can be freely selected and moreover, the vibration of the gear box is difficult to be transmitted to the steering wheel and hence, the above-described problems can be solved.

In such cable-type steering device, the steering torque inputted from the steering wheel is relatively small with an upper limit value restricted by a driver's physical strength. However, a road surface reaction torque produced when wheels are brought into contact with a curb may reach a magnitude of 10 times as large as the steering torque in some cases. Therefore, if the cable-type steering device is designed to be able to withstand such road surface reaction torque, there is encountered a problem that it is necessary to increase the strength of the cable-type steering device, resulting in increased weight and size and an increased cost of manufacture. Another problem is that if a large road surface reaction torque is transmitted to the steering wheel without being buffered, the feeling of a driver grasping the steering wheel is degraded.

SUMMARY OF THE INVENTION

The present invention has been accomplished with the above circumstance in view, and it is an object of the present invention to provide a cable-type steering device, wherein the road surface reaction torque inputted from wheels can be effectively buffered by a simple structure. To achieve the above object, according to the present invention, wires comprised of inner members slidably accommodated in outer members, with opposite ends of the inner members coupled at one end to a wire driving means rotatably connected to a steering wheel and at their other ends to a wire follower means rotatably connected to a gear box for steering vehicle wheels, respectively. Therefore, if the steering wheel is operated to rotate the wire driving means comprised of, for example, a pulley, the inner members slide within the outer members of the wires to rotate the wire follower means comprised of, for example, a pulley, and such rotation is transmitted to the gear box to steer the wheels.

The outer members are slidably supported at their opposite ends in wire penetration bores defined in housings in which the wire driving means and the wire follower means are accommodated, and the opposite ends of the outer members are biased in an outward direction from bores in the housings by resilient members. Therefore, when the wheels ride onto an obstacle and as a result, a road surface reaction torque is inputted, the outer members are pulled into the housings, while compressing the resilient members along with the inner members pulled by the wire follower means, and are pushed into the housings, while compressing the resilient members along with the inner members pushed by the wire driving means. Thus, the road surface reaction torque is buffered and not entirely transmitted to the steering wheel.

The resilient member is comprised of a coil spring loosely fitted over an outer periphery of the inner member. One end of the coil spring is placed to abut against a spring seat provided in the housing, and the other end of the coil spring is placed to abut against a spring seat provided at an end of the outer member. With such construction, the coil springs can be accommodated in a compact manner and moreover, the outer members can be biased smoothly in an axial direction.

The mode for carrying out the present invention will now be described by way of an embodiment with reference to the accompanying drawings.

DESCRIPTION OF THE PREFERRED EMBODIMENTS

Figure 1:
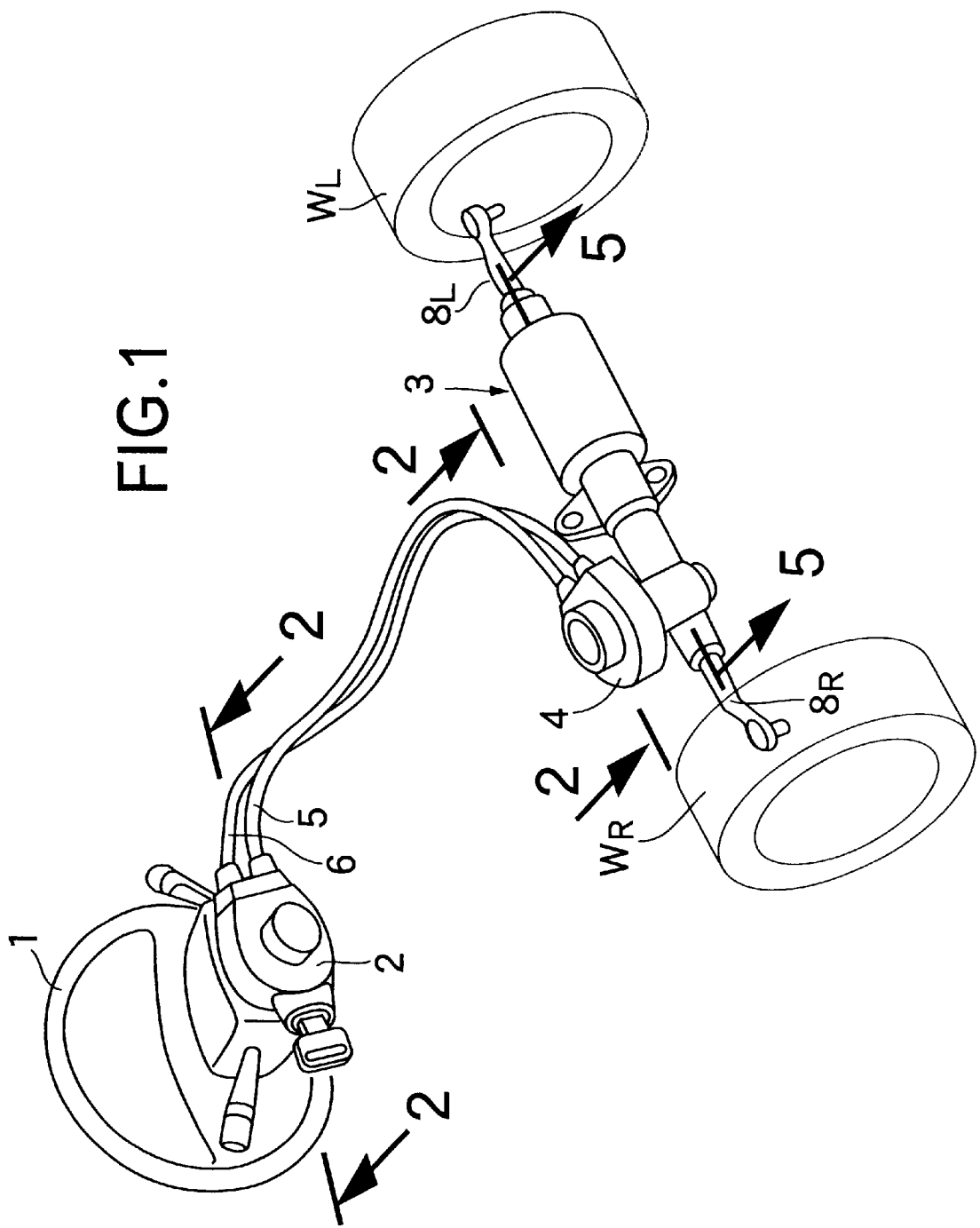
FIG. 1 is a perspective view of the entire arrangement of a steering device for a vehicle according to an embodiment.

As shown in FIG. 1, a driving pulley housing 2 mounted in front of a steering wheel 1 of an automobile and a follower pulley housing 4 mounted on a gear box 3 are connected to each other by two Bowden wires 5 and 6. Tie rods $8_L$ and $8_R$ extend laterally of a vehicle body from opposite ends of the gear box 3 and are connected to knuckles (not shown) for supporting left and right wheels $W_L$ and $W_R$ of the automobile.

Figure 2:
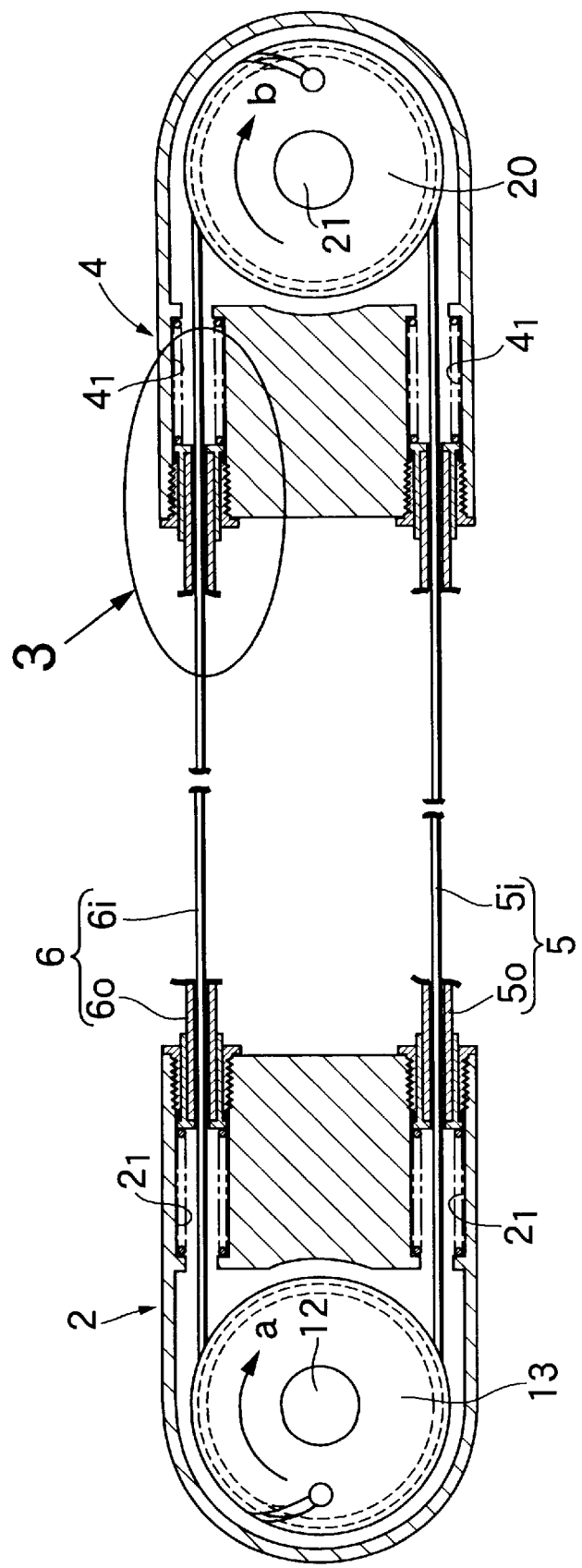
FIG. 2 is an enlarged sectional view taken along the lines 2—2 in FIG. 1.

As shown in FIG. 2, a driving pulley 13 is fixed to a rotary shaft 12 which is rotatably supported in the driving pulley housing 2 and rotated by the steering wheel 1. A follower pulley 20 is fixed to a rotary shaft 21 which is rotatably supported in the follower pulley housing 4. Each of two Bowden wires 5 and 6 is comprised of an outer tube 5o, 6o and an inner cable 5i, 6i slidably fitted in the outer tube 5o, 6o, respectively. Opposite ends of each of the inner cables 5i and 6i are wound in a plurality of turns around and fixed in a helical pulley groove defined around outer peripheries of the driving pulley 13 and the follower pulley 20. Opposite ends of each of the outer tubes 5o and 6o are supported in the driving pulley housing 2 and the follower pulley housing 4 by a structure which will be described hereinafter.

Figure 3:
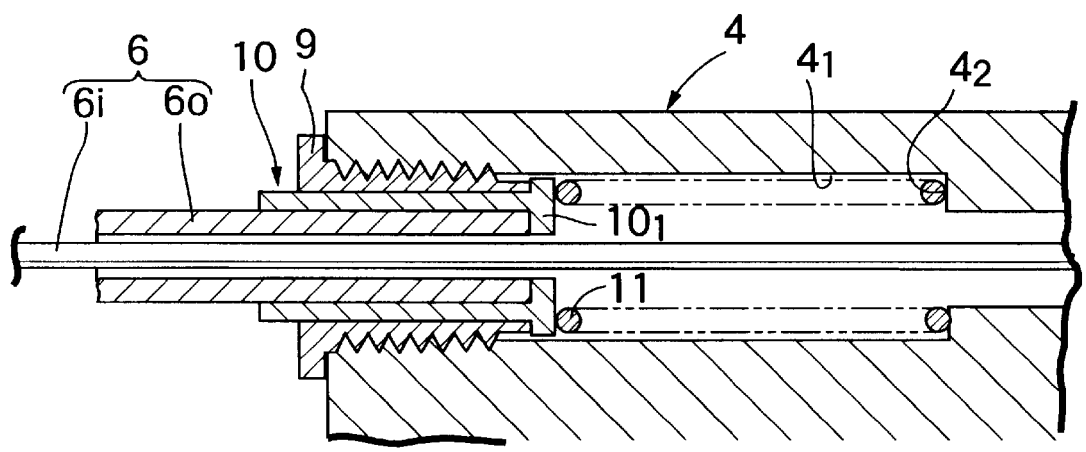
FIG. 3 is an enlarged view of a portion surrounded by an ellipse marked by an arrow 3 in FIG. 2.

As can be seen from FIG. 3, a wire holder 9 is screwed in an outer opening of a wire penetration bore $4_1$ in the follower pulley housing 4 (see also the corresponding structure of a wire penetration bore $2_1$ in the driving pulley housing 2 in FIG. 2). An end member 10 is fitted over an outer periphery of an end of the outer tube 6o of one of the Bowden wires 6 and slidably supported on an inner periphery of the wire holder 9. A coil spring 11 as a resilient member is loosely fitted over an outer periphery of the inner cable 6i and supported at its opposite ends between a spring seat $10_1$ formed on an end face of the end member 10 and a spring seat $4_2$ formed in the wire penetration bore $4_1$. The outer tuber 6o is biased by a preset load applied to the coil spring 11 in a direction of pushing-out from the follower pulley housing 4, to a position in which a back surface of the spring seat $10_1$ of the end member 10 abuts against an end face of the wire holder 9.

The structure for supporting the other Bowden wire 5 in the follower pulley housing 4 and the structure for supporting the two Bowden wires 5 and 6 in the driving pulley housing 2 are the same as the structure described with reference to FIG. 3.

Figure 5:
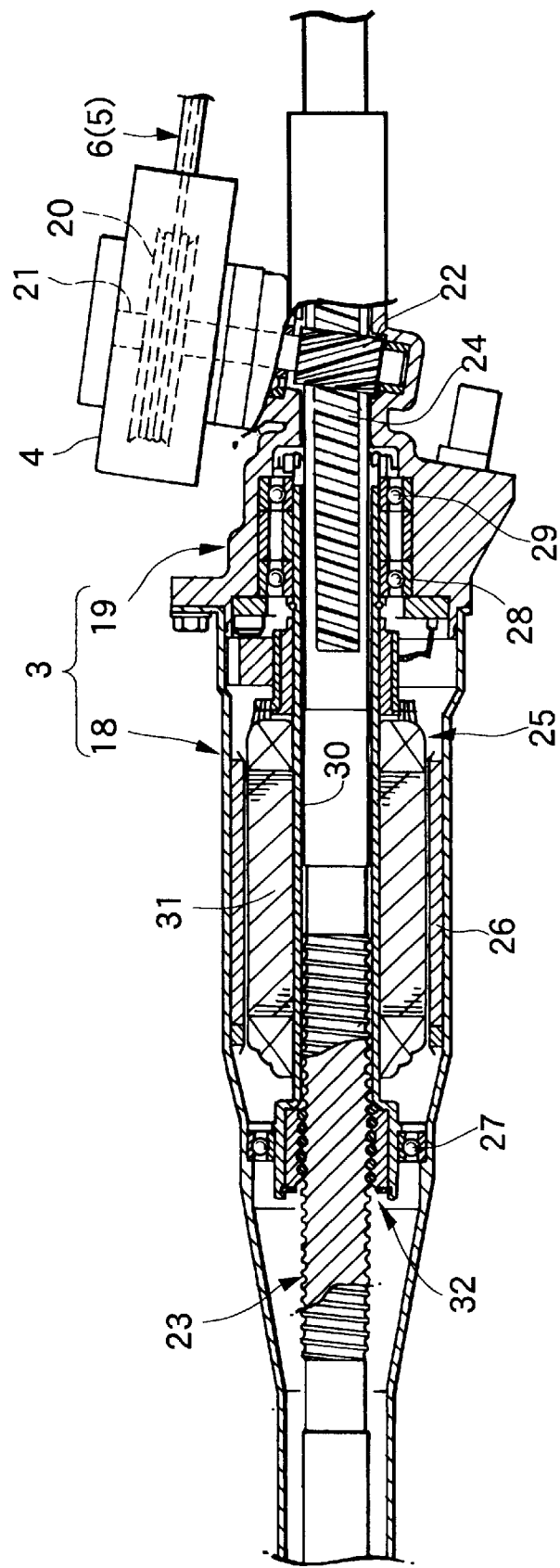
FIG. 5 is an enlarged sectional view taken along a line 5—5 in FIG. 1.

As shown in FIG. 5, the gear box 3 is divided into a left motor accommodating chamber 18 and a right rack and pinion accommodating chamber 19, and the follower pulley housing 4 is supported on the rack and pinion accommodating chamber 19. A rotary shaft 21 integral with the follower pulley 20 mounted in the follower pulley housing 4 extends into the rack and pinion accommodating chamber 19, and a pinion 22 is secured to such extension. A steering rod 23 connected at its opposite ends to the tie rods $8_L$ and $8_R$ is laterally slidably supported within the gear box 3, and the pinion 22 is meshed with a rack 24 formed on the steering rod 23.

A motor 25 for a power-steering operation is accommodated in the motor accommodating chamber 18 in the gear box 3 and includes a stator 26 secured to an inner peripheral surface of the motor accommodating chamber 18, a motor output shaft 30 rotatably supported on the inner peripheral surface of the motor accommodating chamber 18 through three ball bearings 27, 28 and 29, and fitted over an outer periphery of the steering rod 23, and a rotor 31 secured to the motor output shaft 30 and opposed to the stator 26. A ball screw mechanism 32 is interposed between an inner peripheral surface of the motor output shaft 30 and an outer peripheral surface of the steering rod 23, so that a steerage assisting force for laterally reciprocating the steering rod 23 can be generated by driving the motor 25 to rotate the motor output shaft 30 in opposite directions.

The operation of the embodiment of the present invention having the above-described arrangement will be described below.

For example, if the steering wheel 1 is rotated leftwards to turn the vehicle leftwards, the rotary shaft 12 is rotated in a direction of an arrow a in FIG. 2 along with the driving pulley 13. As a result, the inner cable 5i of the Bowden wire 5 is pulled, and the inner cable 6i of the Bowden wire 6 is loosened. This causes the rotation of the driving pulley 13 to be transmitted to rotate the follower pulley 20 and rotary shaft 21, so that a steering torque is transmitted through the pinion 22 to the rack 24.

If the steering torque is detected by a detecting means (not shown), the detection value of the steering torque is subjected to a calculation along with another control signal in an electronic control unit, and the power-steering motor 25 is driven based on the result of the calculation. Then, the steering rod 23 is driven laterally by the motor 25 for the power-steering operation, thereby assisting the driver's manipulation of the steering wheel 1.

Since the steering wheel 1 and the gear box 3 are connected to each other by the Bowden wires 5 and 6 having a flexibility as described above, the steering wheel 1 can be disposed at any location with respect to the gear box 3, leading to an increased degree of freedom of design. Thus, the gear box 3 can be commonly used in a right-hand steered vehicle and a left-hand steered vehicle, and the structures of a tilt mechanism and a telescopic mechanism for the steering wheel 1 can be simplified.

A conventional steering shaft connecting the steering wheel 1 and the gear box 3 is not used and hence, the vibration of the gear box 3 and the vibration of an engine are not readily transmitted to the steering wheel 1, thereby not only providing an enhanced riding comfort, but also ensuring a sufficient space around driver's feet to provide an enhanced operator comfort. Moreover, in the event of a collision of the vehicle, the steering wheel 1 can be moved forwards of the vehicle body at a sufficient stroke and hence, a large shock absorbing effect can be exhibited.

The upper limit of the steering torque inputted from the steering wheel 1 to the driving pulley 13 is relatively small, because it depends on a driver's physical strength. However, when the wheels $W_{FL}$ and $W_{FR}$ are brought into contact with a curb, a road surface reaction torque inputted to the follower pulley 20 may reach a value of about 10 times as large as the steering torque in some cases. The preset loads of the coil springs 11 mounted in the driving pulley housing 2 and the follower pulley housing 4 are set larger than the upper limit of the steering torque and hence, during normal operation of the steering wheel 1, the coil springs 11 cannot be compressed, and the rotation of the driving pulley 13 is transmitted, as it is, to the follower pulley 20.

Figure 4:
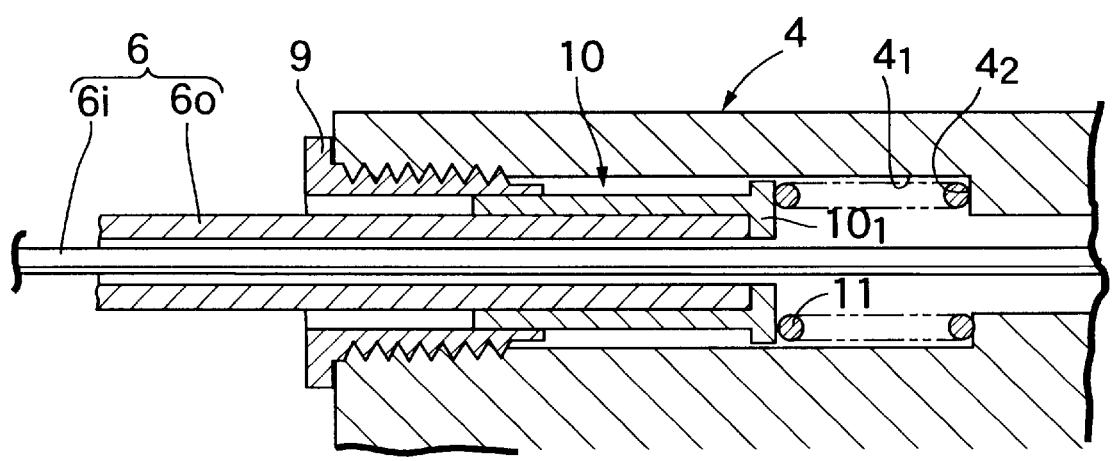
FIG. 4 is a view similar to FIG. 3 for explaining the operation of the embodiment.

Now, if the follower pulley 20 is rotated, for example, in a direction of an arrow b in FIG. 2 by a large road surface reaction torque inputted from the wheels $W_{FL}$ and $W_{FR}$, a tensile force is applied to one of the Bowden wires 6, and an urging force is applied to the other Bowden wire 5. If the road surface reaction torque exceeds the preset loads of the coil springs 11, the outer tube 6o is drawn into the follower pulley housing 4, while compressing the coil spring 11 along with the inner cable 6i of the Bowden wire 6 with the tensile force applied thereto, as shown in FIG. 4. On the other hand, the outer tube 5o is forced into the driving pulley housing 2, while compressing the coil spring 11 along with the inner cable 5i of the Bowden wire 5 with the urging force applied.

The Bowden wires 5 and 6 transmit a driving force, when the inner cables 5i and 6i are moved relative to the outer tubes 5o and 6o. However, when the inner cables 5i and 6i are moved in unison with the outer tubes 5o and 6o rather than being moved relative to the outer tubes 5o and 6o, the loosened states of the Bowden wires 5 and 6 between the driving pulley housing 2 and the follower pulley housing 4 are merely varied, and a driving force is not transmitted. Namely, if a large road surface reaction torque is inputted from the wheels $W_{FL}$ and $W_{FR}$, it is buffered by the compressed deformation of the coil springs 11, so that it is difficult to be transmitted to the steering wheel 1. Thus, no excessive load is applied to the driving pulley 13, the follower pulley 20, the Bowden wires 5 and 6 and the like, which avoids the necessity of substantially increasing the strength of those elements. Therefore, it is possible not only to reduce the size, weight, and cost of the steering device but also to enhance the feeling of a driver grasping the steering wheel 1.

The coil springs 11 are coaxially fitted over the outer peripheries of the inner cables 5$i$ and 6$i$ and hence, can be disposed in a compact manner, while the outer tubes 5$o$ and 6$o$ are biased smoothly along the inner cables 5$i$ and 6$i$.

Although the embodiment of the present invention has been described in detail, it will be understood that the present invention is not limited to the above-described embodiment, and various modifications may be made without departing from the spirit and scope of the invention as defined by the claims.

For example, the driving pulley 13 and the follower pulley 20 are employed as a wire driving means and a wire follower means in the embodiments. However, in place of these pulleys 13 and 20, arms may be employed in the form of levers which are secured at their central portions to the rotary shafts 12 and 21 and connected at their opposite ends to the inner cables 5$i$ and 6$i$ of the Bowden wires 5 and 6.

As discussed above, in the embodiment according to the present invention, is the outer members are slidably supported at their opposite ends in wire penetration bores defined in housings in which the wire driving means and the wire follower means are accommodated, respectively, and the opposite ends of the outer members are biased in a direction of pushing-out from the bores in the housings by resilient members. Therefore, when a road surface reaction torque is inputted from the wheels, the outer and inner members of the wires are moved in unison with each other, while compressing the resilient members, and thereby preventing an excessive load resulting from the road surface reaction torque from being applied to the wire driving means, the wire follower means and the wires. Thus, it is possible to reduce the size and weight of the cable-type steering device, and minimizing transmission of the road surface reaction torque to the steering wheel, thereby leading to an enhanced feeling.

According to a preferred embodiment of the invention, the resilient member is comprised of a coil spring loosely fitted over the outer periphery of the inner member with one end of the coil spring placed to abut against a spring seat provided within the housing, while the other end of the coil spring is placed to abut against a spring seat provided at the end of the inner member. Therefore, the coil spring can be disposed in a compact manner while the outer members can be biased smoothly in the axial direction.

What is claimed is:

1. A cable steering device comprising:

a pair of wires having inner members slidably accommodated in outer members, said inner members being coupled at their opposite ends to wire driving means rotatably connected to a steering wheel and to wire follower means rotatably connected to a gear box for steering vehicle wheels, so that a steering torque inputted to the steering wheel is transmitted to the gear box through said inner members;

a wire penetration bore defined in a housing in which at least one of the wire driving means and the wire follower means is accommodated;

a tubular wire holder having screw threads on an outer periphery screwed to an inner surface of said wire penetration bore;

a tubular end member attached to an outer periphery of at least one of said outer members and slidably fitted within said tubular wire holder; and a resilient member biasing an end of said tubular end member in an outward direction relative to said wire penetration bore.

2. A cable steering device according to claim 1, wherein said resilient member is a coil spring loosely fitted around an outer periphery of at least one of said inner members, one end of said coil spring abutting against a spring seat within said penetration bore, and another end of said coil spring abutting said end of said tubular end member.

* * * * *